United States Patent [19]

Wakamatsu

[11] Patent Number: 4,584,779
[45] Date of Patent: Apr. 29, 1986

[54] TRIMMING SQUARE SET

[76] Inventor: Hiroto Wakamatsu, 12-16, Inogashira 1-chome, Mitaka-shi, Tokyo 181, Japan

[21] Appl. No.: 744,697
[22] PCT Filed: Oct. 20, 1984
[86] PCT No.: PCT/JP84/00502
§ 371 Date: Jun. 11, 1985
§ 102(e) Date: Jun. 11, 1985
[87] PCT Pub. No.: WO85/01918
PCT Pub. Date: May 9, 1985

[30] Foreign Application Priority Data

Oct. 26, 1983 [JP] Japan ............................. 58-199262
Jun. 28, 1984 [JP] Japan ............................. 59-134006

[51] Int. Cl.[4] .............................................. B43L 7/06
[52] U.S. Cl. ................................. 33/464; 33/DIG. 9
[58] Field of Search .................. 33/DIG. 9, 425, 428, 33/474, 403, 464

[56] References Cited

U.S. PATENT DOCUMENTS

| | | | |
|---|---|---|---|
| 2,342,525 | 2/1944 | Berry | 33/DIG. 9 |
| 2,494,077 | 1/1950 | Wilkinson | 33/DIG. 9 |
| 2,646,626 | 7/1953 | Palin | 33/DIG. 9 |
| 2,972,811 | 2/1961 | Swayze | 33/464 |
| 4,417,399 | 11/1983 | Baliozian | 33/DIG. 9 |

FOREIGN PATENT DOCUMENTS 2117711 10/1983 United Kingdom ........... 33/DIG. 9

Primary Examiner—Willis Little
Attorney, Agent, or Firm—Oblon, Fisher, Spivak, McClelland & Maier

[57] ABSTRACT

Disclosed herein is a trimming square set suitable for trimming photographic films, drawings or the like into arbitrary rectangular shapes.

The square set utilized the rule that the four apices of a rectangle are invariably located on one circumference, permitting to form a rectangle of a desired size in an extremely facilitated manner by means of a first square member rotatably mounted on a base plate, a second square member rotatably mounted on a slide plate which is slidable on the base plate, and a circular hole provided in the base plate. Similar rectangles of different sizes can be formed easily by sliding the slide plate on the base plate.

6 Claims, 8 Drawing Figures

TRIMMING SQUARE SET

FIELD OF THE INVENTION

This invention relates to a square set particularly suitable for trimming photographic films, drawing sheets or the like into a rectangular shape.

BACKGROUND OF THE INVENTION

Compilation of materials for catalogues, books, newspapers or the like invariably involves trimming jobs, for example, trimming of an image on a photographic film or drawing to be fitted in a specified space or frame on a catalogue or the like. In such a case, it has been the usual practice to trim the object image into a square or rectangular shape conforming with the shape of the mounting space. This job is very troublesome and time-taking and requires meticulous skill. Therefore, there have been demands for development of a drafting or drawing implement which can facilitate the trimming jobs.

DISCLOSURE OF THE INVENTION

It is an object of the present invention to provide a trimming square set which can form a desired rectangular shape in a simple and quick manner by the use of a couple of square members.

It is another object of the invention to provide a trimming square set which permits trimming of rectangular shapes of arbitrary length-to-width ratios quickly in a facilitated manner.

It is a further object of the invention to provide a trimming square set which permits trimming of rectangular shapes of arbitrary areal ratios quickly in a facilitated manner.

The trimming square set according to the invention basically comprises: a base plate having a circular opening therein; a first square member having inner edges set at right angles to each other and pivotally supported on the base plate by a pin member located at a position proximate to the peripheral edge of the circular opening, at a point proximate to an intersecting point of the inner edges; a slide plate being slidingly movable on said base plate in a direction parallel with an imaginary line passing through the center of the pin member and the circular opening and provided with a semi-circular notch on the inner side thereof congruently with the shape of the peripheral edge of the circular opening of said base plate; and a second square member having inner edges set at right angles to each other and pivotally supported on the slide plate on said base plate by a second pin member located on the imaginary line and in a position proximate to the peripheral edge of the semi-circular notch, at a point proximate to the intersecting point of the inner edges thereof.

With the above-described arrangement, utilizing the rule that the four apeces of a rectangle are located on one and same circumference, a rectangle is formed in an extremely simple manner by setting the semi-circular notch of the slide plate congruently on the circular opening of the base plate and positioning the inner edges of one square member on a point of intersection of the inner edges of the other square member with the marginal edge of the circular opening of the base plate. In addition, after forming a rectangle in this manner, similar rectangular shapes of arbitrary sizes can be formed simply by sliding the slide plate.

Further, the trimming square set according to the invention is provided with a scale of length-to-width ratio along the peripheral edge of the circular opening of the base plate or of the semi-circular notch of the slide plate which is shaped congruently with the circular opening, so that a rectangle of a desired length-to-width ratio can be obtained simply by aligning the semi-circular notch of the slide plate with the circular opening in the base plate and positioning the inner edges of one square member on the graduations of the desired length-to-width ratio. This is especially convenient when trimming a photograph or drawing into a rectangular shape of a given length-to-width ratio.

Moreover, the trimming square set according to the invention is provided with a scale of areal reduction ratio on part of frames provided around the outer periphery of the base plate, indicating the areal reduction ratios of the rectangular shape which is formed by the inner edges of the first and second square members, thereby permitting to form a rectangle of a desired reduction ratio easily.

The above and other objects, features and advantages of the invention will become apparent from the following description and the appended claims, taken in conjunction with the accompanying drawings which show by way of example preferred embodiments of the invention.

THE BEST MODE FOR CARRYING OUT THE INVENTION

Figure 1:
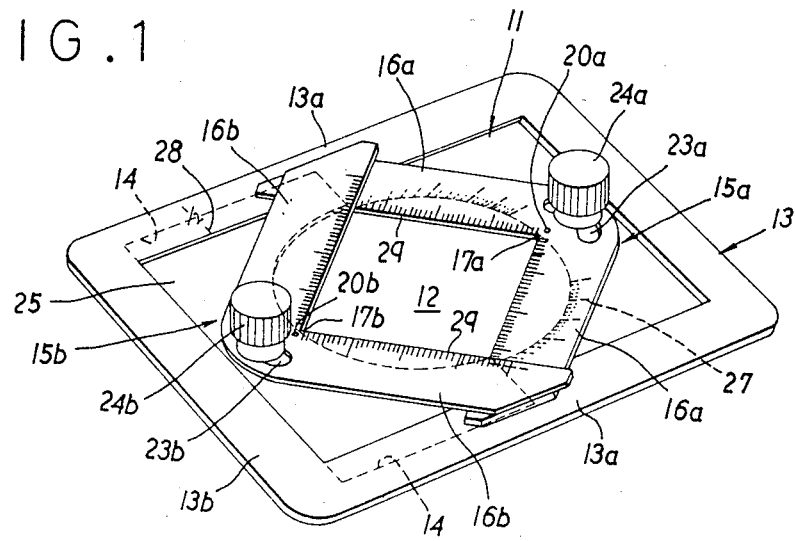
FIG. 1 is a perspective view of a trimming square set embodying the present invention.
Figure 2:
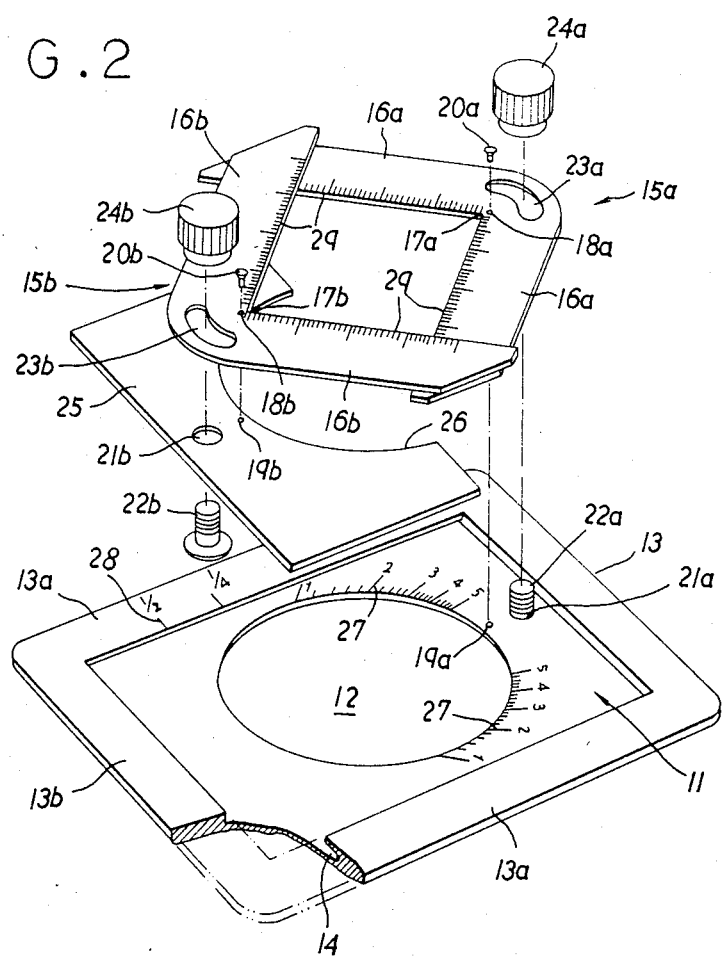
FIG. 2 is an exploded perspective view of the same trimming square set.

As shown in FIGS. 1 and 2, the trimming square set according to the invention includes a rectangular base plate 11 of a transparent synthetic resin, which is centrally provided with a circular opening 12 and an outer frame 13 with rectangular inner edges around the circular opening 12. The longer sides 13a, 13a of the frame 13 are provided with grooves 14.

A first square member 15a of a transparent synthetic resin is constituted by arms 16a, 16a with inner edges thereof set at right angles to each other, and rotatably mounted on the base plate 11 by a pin 20a which is inserted in a pin hole 18a provided at as close a position as possible to an intersecting point 17a of the inner edges of the square arms 16a, 16a and a pin hole 19a provided in the base plate 11 at as close a position as possible to the peripheral edge of the circular opening 12. The base plate 11 is also provided with a screw hole 21a at a position proximate to the pin hole 19a for receiving a screw 22a thereinto, while the first square member 15a is provided with an arcuate slot 23a on the outer side of and about the pin hole 18a which is located at the center of the arc of the slot 23a. By tightening a box nut 24a onto the screw 22a which is received in the hole 21a of the base plate 11 and the arcuate slot 23a, the first square 15a is fixed at an arbitrary angle on the base plate 11.

Thus, even if the first square member 15a is turned relative to the base plate 11, the intersecting point 17a of the inner edges of its arms 16a, 16a is invariably located substantially at one set point at the peripheral edge of the circular opening 12 of the base plate 11.

A slide plate 25 which is likewise formed of a transparent synthetic resin material has its opposite ends fitted in the grooves 14 provided in the longer sides 13a of the frame 13 along the inner edges thereof, and is provided with a semi-circular notch 26 on the inner side, which semi-circular notch 26 congruently overlies on the circular opening 12 of the base plate 11 when the slide plate 11 is abutted on one of the shorter end frame portions 13b (the one located away from the first square member 15a) of the outer frame 13. The slide plate 25 is slidable in the grooves 14 in a direction parallel with an imaginary line passing through the centers of the pin 20a and the circular opening 12.

A second square member 15b similarly formed of a transparent synthetic resin material is constituted by arms 16b, 16b with inner edges thereof set at right angles to each other, and rotatably mounted on the slide plate 25 by a pin 20b which is fitted in a pin hole 18b provided in the second square member 15b at as close a position as possible to a point of intersection 17b of the inner edges of the arms 16b, 16b and a pin hole 19b provided in the slide plate 25 at a position provided as close a position as possible to the peripheral edge of the semi-circular notch. The pin 20b is located on an imaginary line passing through the centers of the pin 20a and the circular opening 12. Accordingly, the distance between the pins 20a and 20b is substantially equal to the diameter of the circular opening 12.

Similarly to the first square member 15a, the second square member 15b is fixable at an arbitrary angle on the slide plate 25 by tightening a box nut 24b onto a screw 22b which is fitted in a hole 21b provided in the slide plate 25 at a position close to the aforementioned pin hole 19b and the arcuate slot 23b in the second square member 15b.

Therefore, in the same manner as the first square member 15a, the intersecting point 17b of the inner edges of the arms 16b, 16b is constantly located substantially on one point on the peripheral edge of the semi-circular notch 26 of the slide plate 25 even if rotated relative to the slide plate 25.

A scale 27 of length-to-width ratio provided along the peripheral edge of the circular opening, on the side away from the slide plate 25, indicates the length-to-width ratio of the rectangle formed by the first and second square members 15a and 15b, each graduation of the scale bearing a figure of the length-to-width ratio of the corresponding rectangle, for example, a figure of "2" indicating that the length-to-width ratio is 1:2. If desired, the scale 27 of length-to-width ratio may be provide along the peripheral edge of the notch 26 of the slide plate 25.

Denoted at 28 is a reduction scale which is provided on the frame portion 13a, the graduations of the scale bearing figures which indicate reduction ratios of the rectangular area formed by the arms 16a, 16a and 16b, 16b of the first and second squares 15a and 15b, for example, figures of ½ indicating that the reduction ratio of the rectangular area is ½. The reference numeral 29 indicates scales on the square arms 16a, 16a and 16b, 16b having zero points at the intersecting points 17a and 17b respectively.

For trimming an image on a photographic film to fit same in a specified frame on a layout sheet, the above-described trimming square is handled in the manner as follows.

Figure 5A:
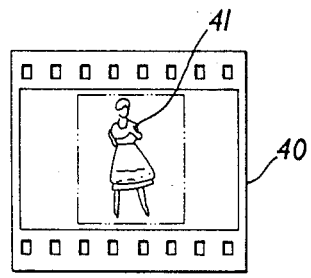
FIGS. 5A and 5B are diagrammatic illustrations employed to explain how to use the trimming square set.
Figure 5B:
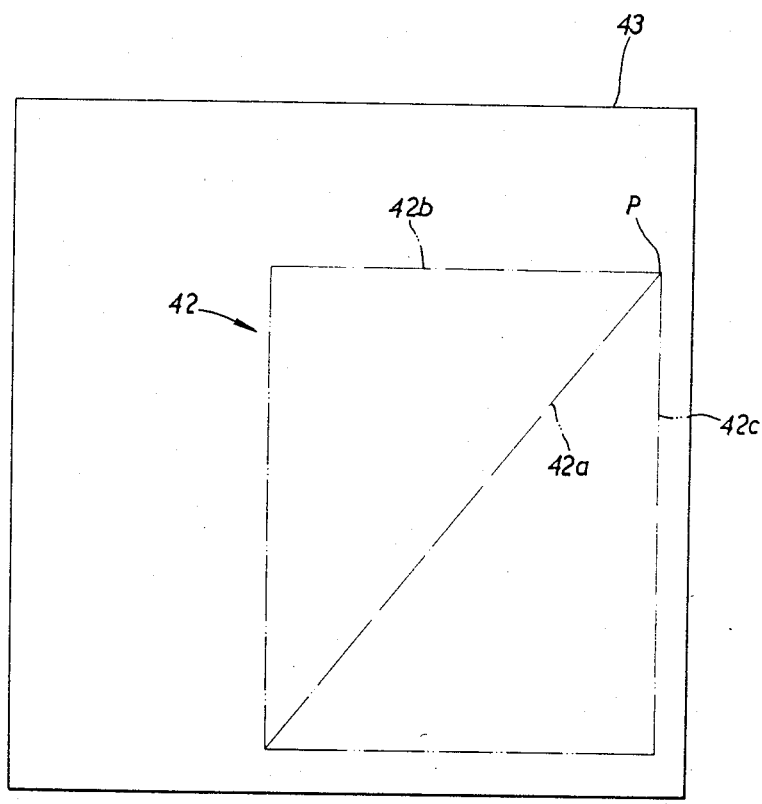

For example, the trimming operation is explained by way of a case where an image 41 on a photographic film 40 as shown in FIG. 5A is trimmed into the shape of a frame 42 on a layout board 43 as shown in FIG. 5B. In such a case, an opaque paper sheet may be releasably adhered to the photographic film 40 beforehand.

In the first place, after loosening the box nuts 24a and 24b, the intersecting point 17a of the first square member 15a is positioned on the point P of the frame 42, and the intersecting point 17b of the second square member 15b is positioned on the diagonal line 42a of the frame 42. Nextly, the first square member 15a is turned until the inner edges of its arms 16a, 16a get in line with the end and side lines 42b and 42c of the frame 42, and in this state the first square member 15a is fixed to the base plate 11 by tightening the box nut 24a. Then, the square is detached from the layout frame 42, and the slide plate 25 is moved until it abuts against the end frame 13b on the left side. In this state, the second square member 15b is turned to position which its arms 16b, 16b is positioned on the intersecting points of the inner edges of arms 16a, 16a of the first square member 15a with the marginal edge of the circular opening 12 in the base plate 11, and fixed to the slide plate 25 by tightening the box nut 24b. In this way, the square arms are set in position.

The inner edges of the square arms 16a, 16a and 16b, 16b thus form a rectangle 30 as the distance between the pins 20a and 20b at the centers of rotation of the first and second square members 15a and 15b is substantially equal to the diameter of the circular opening 12 in the base plate 11 and an imaginary line which connects the pins 20a and 20b passes through the center of the circular opening 12. Further, as shown in FIGS. 3B and 4B, a rectangle 30a similar to the thus obtained rectangle 30 is formed by sliding the slide plate 25 of the second square member 15b along the grooves 14 from that position.

The square arms which are set to form a rectangle 30a similar to the layout frame 42 in this manner is placed on the photographic film 40 to be trimmed, and, after framing in necessary portions by sliding the slide plate 25, trimming lines are drawn on the film or an overlying opaque paper sheet with a pencil or other suitable means.

Following are procedures for trimming a photographic film into a rectangular shape of a desired length-to-width ratio or areal reduction ratio.

Figure 3A:
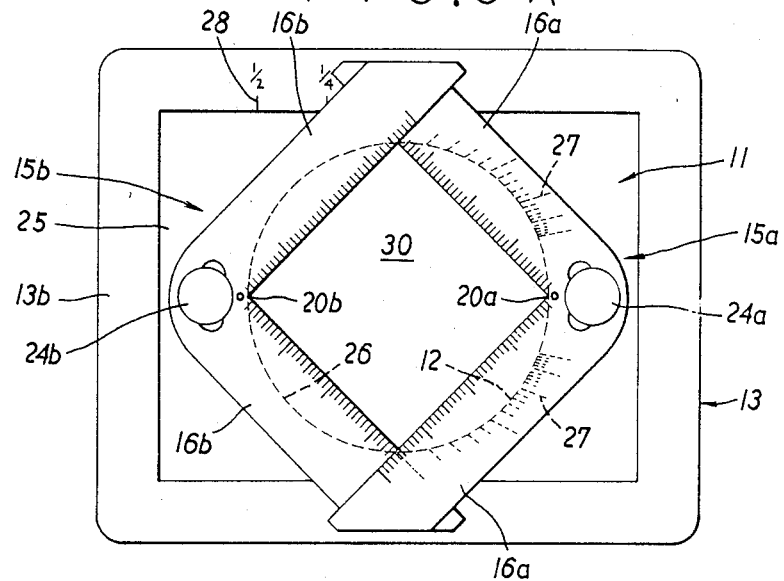
FIGS. 3A, 3B, 4A, and 4B are plan views of the trimming square set in use, showing at A the trimming square forming a rectangular shape of a given length-to-width ratio and at B the trimming square forming a similar rectangular shape on a reduced scale.
Figure 3B:
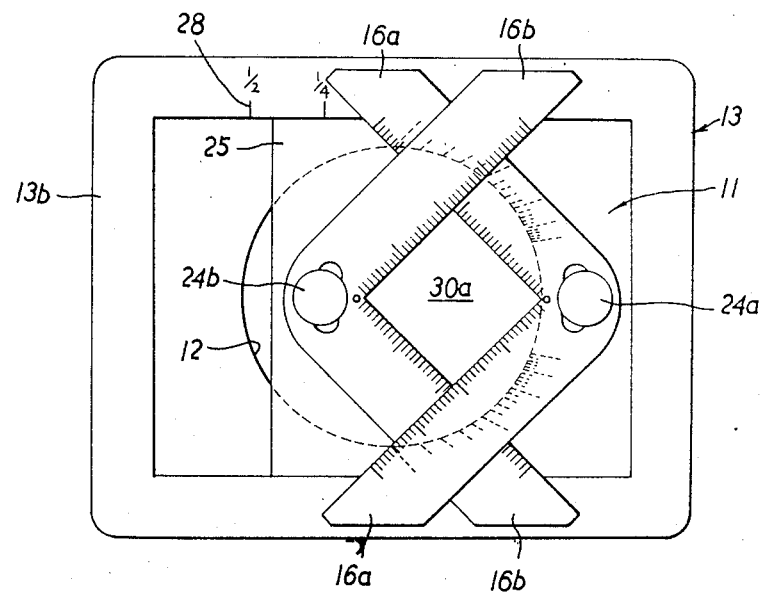
Figure 4A:
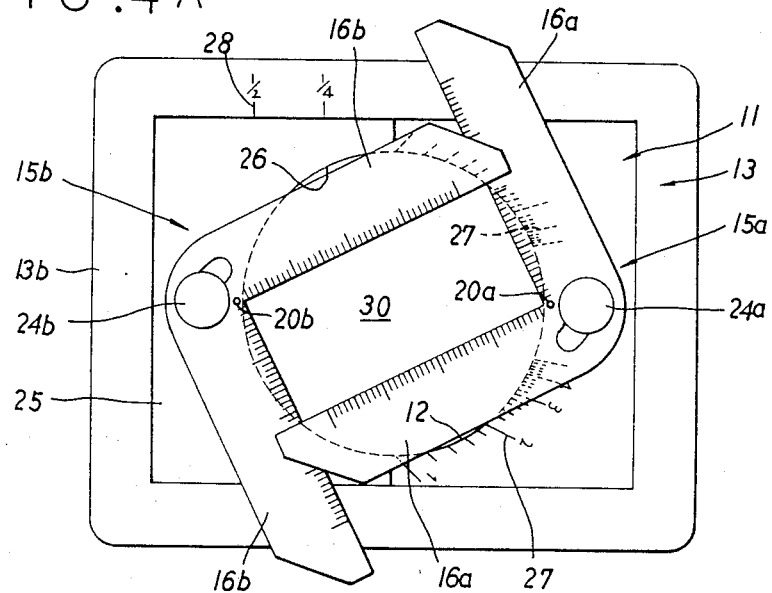
Figure 4B:
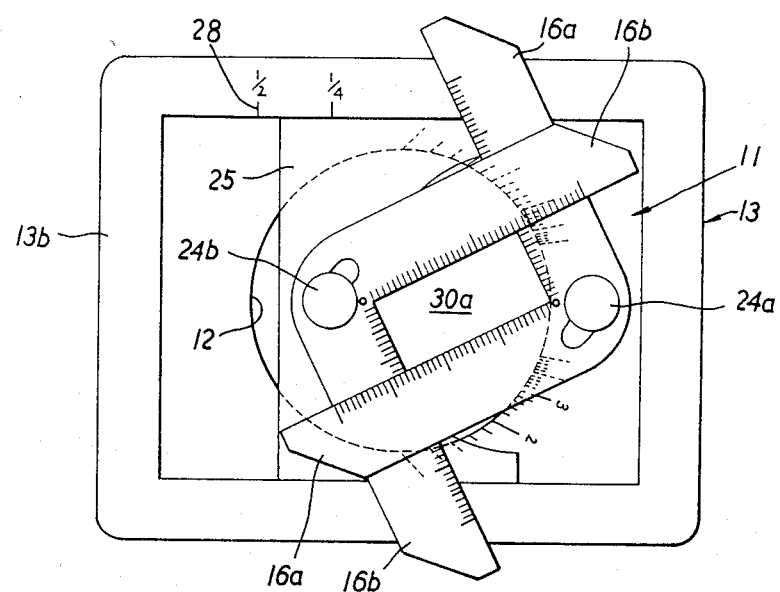

Firstly, as shown in FIGS. 3A and 4A, the slide plate 25 is abutted against the left end frame 13b of the frame 13, congruently overlaying the semi-circular notch 26 of the slide plate 25 on the circular opening 12 of the base plate 11. In this state, the inner edge of one arm 16b of the second square member 15b is positioned at a desired length-to-width ratio on the scale 27 and then the second square member 15b is fixed to the slide plate 25 by tightening the box nut 24b. Thereafter, the first square member 15a is turned until the inner edge of its one square arm 16a is positioned at the point of intersection of the inner edge of the square arm 16b and the marginal edge of the circular opening 12 of the base plate 11, fixing the first square member 15a to the base plate 11 by tightening the box nut 24a.

Thus, the inner edges of the square arms 16a, 16a and 16b, 16b define a rectangle 30, since the distance between the pins 20a and 20b at the centers of rotation of the two square members 15a and 15b is substantially equal to the diameter of the circular opening 12 on the base plate 11 and an imaginary line which connects the pins 20a and 20b passes through the center of the opening 12. The rectangle 30 thus formed has a length-to-width ratio of the value indicated by the graduation on the scale 27, on which the inner edges of the arms 16b of the second square member 15b register.

Further, as illustrated in FIGS. 3B and 4B, if the slide plate 25 of the second square member 15b is slided from the that position along the grooves 14, the inner edges of the square arms form a rectangle 30b similar to the above described rectangle 30.

If, for example, the end face of the slide plate opposite to the end frame portion 13b registers on a graduation of ½ as a resulting of such a sliding shift of the side plate 25, the resulting rectangle 30a has an area which is ½ of the area of the original rectangle 30.

The square which are set to form a rectangle of desired length-to-width ratio and size in this manner are placed on a photographic film to be trimmed, and then the slide plate 25 is moved and set in a position of a desired frame size, tracing the frame line on the photographic film or the overlying opaque paper sheet if necessary.

The length-to-width ratio of the rectangle 30 can be changed arbitrarily by selecting a suitable value on the scale 27 in consideration of the size of an image on the photographic film to be trimmed. When a length-to-width ratio of 1:2 is selected, it becomes possible to form rectangles corresponding to the length-to-width ratio of paper sheets of JIS A- and B-series.

The arms 16a, 16a and 16b, 16b of the first and second square members 15a and 15b may be arranged either in the manner as shown in FIG. 1 where arms of the second square member are laid on the arms of the other square member, or in the manner as shown in FIGS. 3 and 4 where an arm of one square member is laid on the opposing arm of the other square member respectively. Needless to say, the arms of the first square member 15a may be laid on the second square member 15b if desired (not shown).

Although the circular opening 12 is formed in the base plate 11 in the foregoing embodiment, it may be replaced by a circle which is simply drawn on the base plate 11. Further, a scale may be provided on the outer frame members of the base plate 11 to serve as a ruler.

What is claimed is:

1. A trimming square set comprising in combination:
   a base plate having a circular opening therein;
   a first square member having inner edges set at right angles to each other and pivotally supported on the base plate by a pin member located at a position proximate to the peripheral edge of the circular opening of said base plate, at a point proximate to an intersecting point of said inner edges;
   a slide plate being slidingly movable on said base plate in a direction parallel with an imaginary line passing through the centers of said pin member and circular opening and provided with a semi-circular notch congruently with the peripheral edge of said circular opening of said base plate; and
   a second square member having inner edges set at right angles to each other and pivotally supported on said slide plate by a second pin member located on said imaginary line and in a position proximate to the peripheral edge of said semi-circular notch, at a point proximal to the intersecting point of the inner edges thereof.

2. The trimming square set of claim 1, wherein said base plate is provided with a scale of length-to-width ratio of the rectangle formed by inner edges of said first and second square members.

3. The trimming square set of claim 2, wherein said circular opening of said base plate is provided with a scale of length-to-width ratio along the peripheral edge thereof.

4. The trimming square set of claim 2, wherein said semi-circular notch of said slide plate is provided with a scale of length-to-width ratio along the peripheral edge thereof.

5. The trimming square set of claims 1, 2, 3 or 4, wherein said base plate is provided with a scale of areal reduction ratio on part of outer frames thereof, indicating the areal reduction ratio of the rectangle formed by inner edges of said first and second square members.

6. The trimming square set of claim 5, wherein said scale of areal reduction ratio is provided with outer frame portions along the longer sides of said base plate.

* * * * *